United States Patent
Graf

[15] 3,664,875
[45] May 23, 1972

[54] STORAGE BATTERY

[72] Inventor: Armin Graf, Lettenstrasse 32, 9500 Wil, Switzerland

[22] Filed: Dec. 23, 1969

[21] Appl. No.: 887,656

[30] Foreign Application Priority Data

Aug. 29, 1969 Switzerland .................. 13,299/69

[52] U.S. Cl. .................. 136/134 R, 136/166, 136/178
[51] Int. Cl. .................. H01m 5/00, H01m 1/06
[58] Field of Search .................. 136/134, 166, 178

[56] References Cited

UNITED STATES PATENTS

| | | | |
|---|---|---|---|
| 1,106,719 | 8/1914 | Lake | 136/134 R |
| 1,250,460 | 12/1917 | Holland | 136/134 R |
| 1,433,669 | 10/1922 | Towns | 136/134 R |
| 1,712,897 | 5/1929 | Morrison | 136/166 |
| 2,381,140 | 8/1945 | Proctor | 136/134 R |
| 2,516,084 | 7/1950 | Wells | 136/178 |
| 3,463,672 | 8/1969 | Schmidt | 136/166 |

*Primary Examiner*—Donald L. Walton
*Attorney*—Markva & Smith

[57] ABSTRACT

A storage battery, which due to its special lay-out makes it possible to arrange the cells connected in series or in parallel. A package of cells is mounted in a unitized manner upon connecting elements that are provided with polar bridges which simultaneously serve as holding devices for the electrodes. An extremely compact assembly is possible as the length of the storage batteries is shortened, a fact that is of importance in smaller motor cars, where the room available is scarce. In comparison to conventional storage batteries the weight is lower, the leaden bridges are shorter, so that less material are needed, by which the electrical resistance is also reduced.

7 Claims, 11 Drawing Figures

PATENTED MAY 23 1972 3,664,875
SHEET 1 OF 4
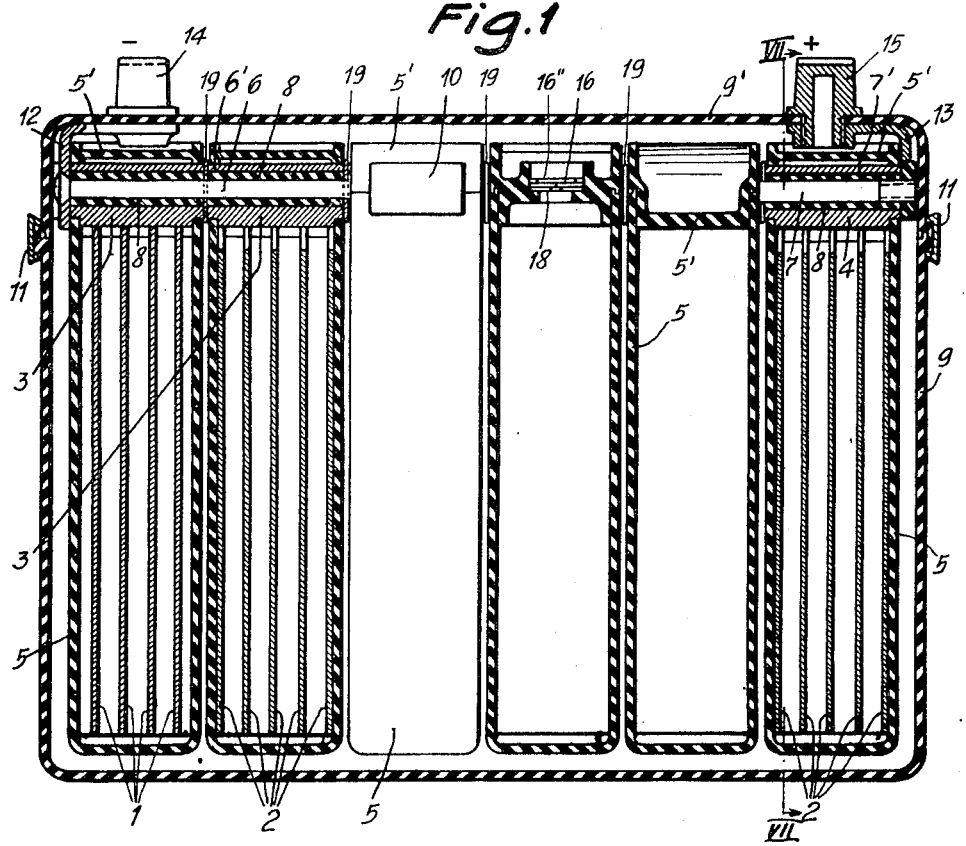
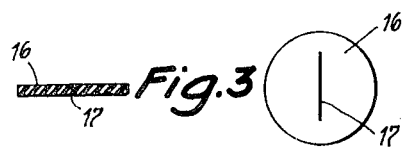
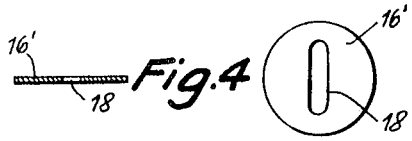
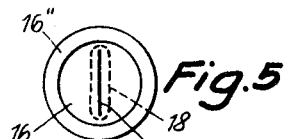
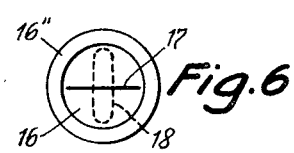
INVENTOR
ARMIN GRAF
BY Lowry, Rinehart & Markva
ATTORNEY

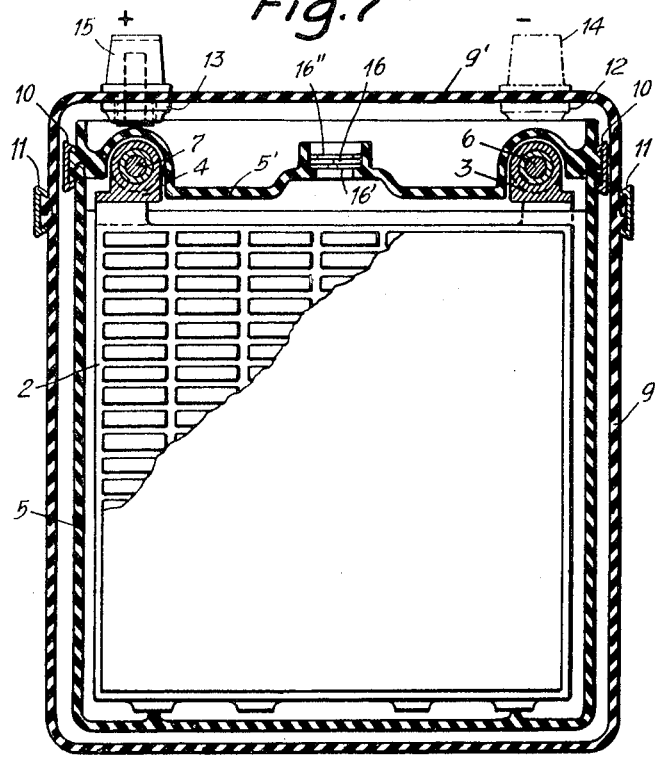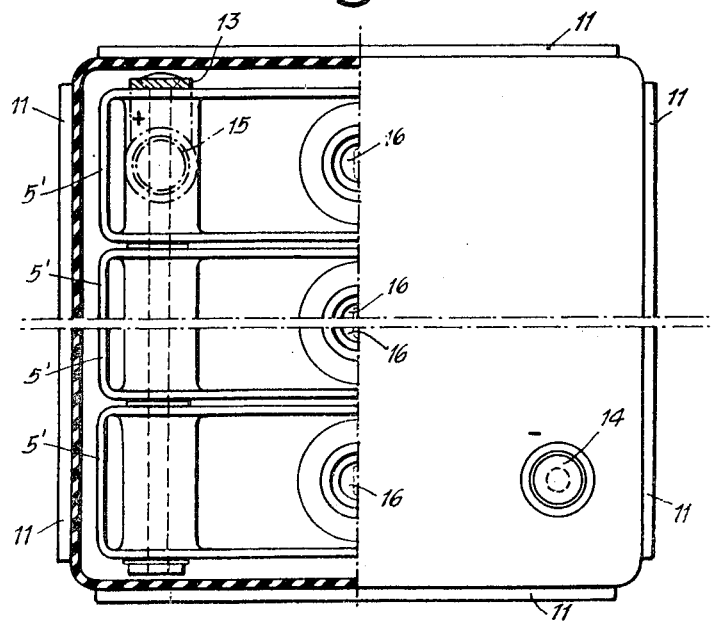

INVENTOR
ARMIN GRAF

1

STORAGE BATTERY

BACKGROUND OF THE INVENTION

In hitherto known storage batteries with liquid sulfuric acid the homopolar electrodes are held together by a particular polar bridge. By this bridge the current is guided upwards and out of the cell through a leaden peg. Outside of the cells, the individual cells are connected by leaden bridges. These connections are relatively long, forcibly at least of a length corresponding to the width of the cells. The disadvantage of such a design is the high weight caused by the long leaden bridges as well as a corresponding additional requirement of material and electrical resistance.

SUMMARY OF THE INVENTION

In accordance with the present invention, a storage battery is provided. The storage battery includes a package of cells mounted in a unitized manner on connecting elements. On these connecting elements polar bridges are provided which simultaneously serve as holders for electrodes.

BRIEF DESCRIPTION OF THE DRAWINGS

FIG. 1 is a partial longitudinal section through the clamping screw 6 of both left side cells, through the clamping screw 7 of the right side cell and, in between centrally, through the cells, while the third cell on the left side represents a lateral view;

FIGS. 2 to 6 are detailed views pertinent to FIG. 1;

FIG. 7 represents a vertical sectional view along the line VII—VII of FIG. 1 with a partial view of a single cell;

FIG. 8 is a plan view related to FIG. 7, with a partial section through the casing;

DESCRIPTION OF THE PREFERRED EMBODIMENT

Figure 9:
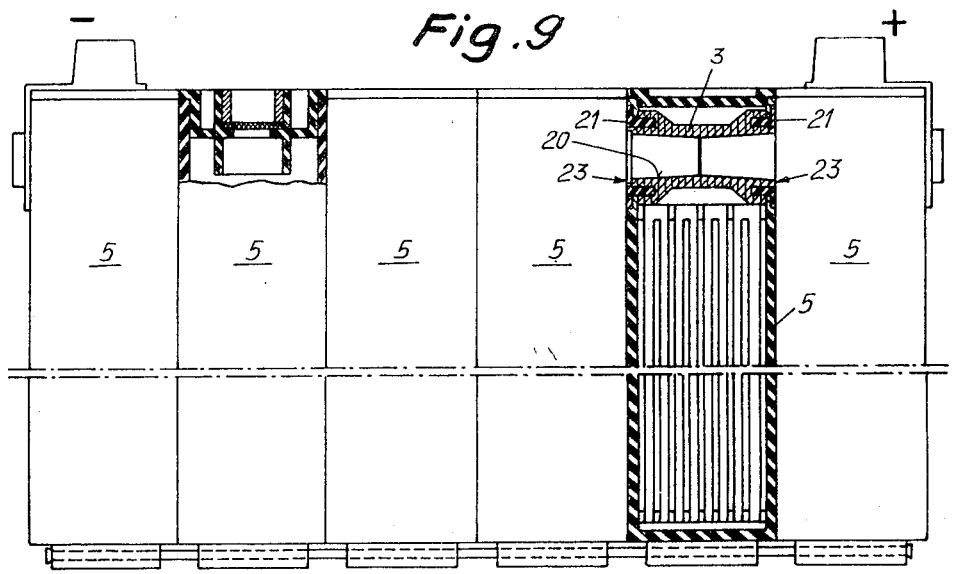
FIG. 9 is a lateral view of a second exemplary embodiment of a storage battery consisting of built together cells, wherein the second cell from the left side is shown as a cut along the line I—I of FIG. 11 and the fifth cell along the line I'—I' of FIG. 11.

The storage battery has a conventional cell design and unitized construction. Each unit thereof forms a storage battery unit ready for use of, for example, 2 volts. In FIG. 1 both first cells on the left side are shown without the positive electrode plates 2, while in the cell on the right side the negative electrode is omitted. In the three in-between-cells both electrodes plates 1, 2 are not shown. In each cell casing the negative electrode plates 1 are immersed in the electrolyte and separated therefrom by a separator the positive electrode plates 2. The electrode plates 1, 2 are rigidly connected by polar bridges 3, 4, serving as holding devices for the electrodes. Each polar bridge is made of one piece and is provided with an axial horizontally oriented bearing bore 6', 7'. The electrode plates 1, 2 of both polarities are directly welded to the respective polar bridges and are conducted out of the interior of the cells through the cell casing walls. Through the bearing bores 6', 7' clamping screws 6, 7, acting as tie rods, are provided. By a suitable contact system using disks 19, which are pushed on the clamping screws 6, 7 and consisting either of contacting or insulating materials, the cells can be arranged in coordinated or parallel connection to form a storage battery unit. The cell casings 5 are sealed with liquid-tight covers 5'. The clamping screws 6, 7 are covered by insulating synthetic hoses 8.

In the shown embodiment one storage battery contains six cells which are positioned in an exterior casing 9 provided with a cover 9'. The parts of the cells as well as the parts of the exterior casing are held together by casing clamps 10 and 11, respectively. At each end of the clamping screws 6, 7 light-metal angles 12 and 13, respectively, are fixed which are rigidly and liquid-tight connected with each of the connecting poles 14 and 15, respectively, arranged on the exterior side of the casing.

In the center of each cell top a safety valve 16 is provided which comprises a rubber disk 16 with a slot 17 therethrough, a metal disk 16' with an oblong hole 18, as a washer, and a clamping ring 16'', as may be seen in FIGS. 2 to 6. This safety valve serves to balance eventually occurring differences of pressure. The valve-controlled pressure conditions depend on the thickness and hardness of the rubber disk 16 and the length of the slot 17, moreover on the size and shape of the oblong hole 18 in the washer 16' and, finally, on the position of the slot 17 in relation to the oblong hole 18. The connecting angles 12, 13, and the thereto threaded connecting poles 14, 15, can be made of an electrically well conducting material, such as aluminum, because they are not exposed to erosion, thus considerably reducing the inner resistance of the battery as well as its weight.

Depending on the inserting of a contacting or an insulating disk 19 as intermediate pieces 3' and 4', respectively, between the polar bridges 3 and 4, respectively, the cell may be arranged in parallel or serial connection.

Figure 10:
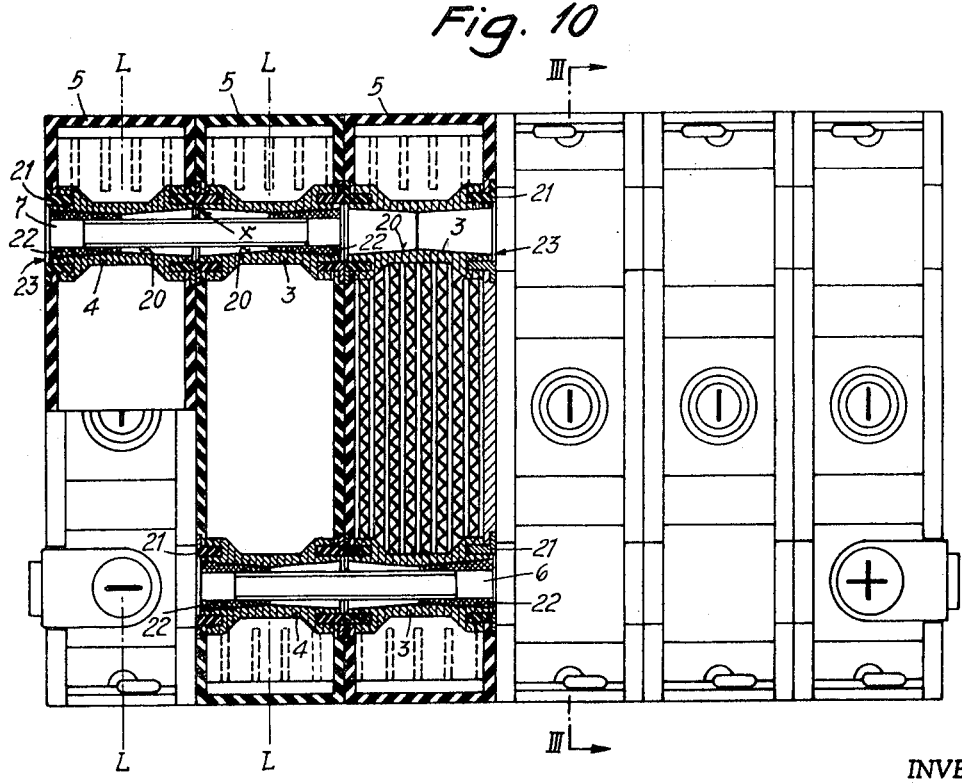
FIG. 10 is a plan view of FIG. 9, wherein half of the first cell from the left side and the two consecutive cells are cut along the line II—II of FIG. 11.
Figure 11:
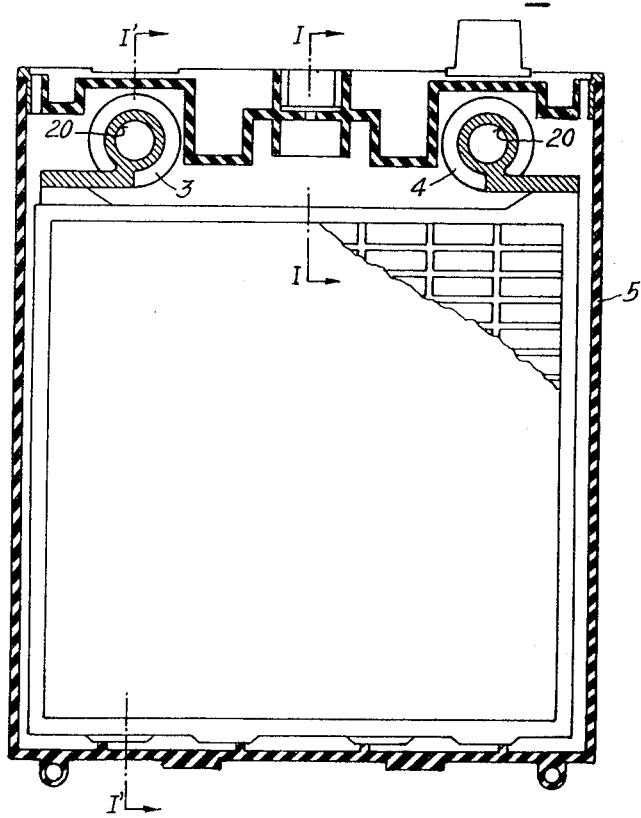
FIG. 11 is a sectional view along the line III—III of FIG. 10.

The second embodiment of the storage battery, as shown in FIGS. 9 to 11, consists of six serially connected cells having their longitudinal casing 5 side-walls directly adjacent to each other. The interior arrangement of the cells differs from the one in the first embodiment in the feature of each polar bridge 3 and 4, respectively, being formed as a hollow conductor with a hollow twin cone 20 widening to both sides outwards from the vertical central plane L—L of the related cell and held in position by two centering flanges 21, made of electrically insulating material and immediately adjacent to the longitudinal side walls of the cell. The centering flanges 21 are on the one side connected with the polar bridges 3 and 4, respectively, and on the other side with the cell casing 5 in such a way, for example, by means of an acid-proof adhesive or ultrasonic welding, as to secure a liquid-tight and air-tight sealing.

For the purpose of assembling several cells — as is clearly shown in FIG. 10 — in each of the outer halves of the twin cone 20 a corresponding cone 22 is set in, which cone is provided with a central bore and clamped by means of a clamping screw 6 or 7, respectively, whereby the cells pierced by the clamping screws are pressed against each other. Simultaneously, due to the fact that each cone 22 consists of electrically conductive material, a good electrical connection is secured between the respective polar bridges 3 and 4 and the clamping screws 6 and 7, respectively. In case of the individual cells being connected in series, as shown in FIG. 10, the polar bridge 4 of a cell belonging to the positive electrode plates is mechanically as well as electrically connected, over a cone 22, a clamping screw 6, respectively 7, and a second cone 22, to the respective polar bridge 3 which is coordinated to the negative electrode plates of the adjacent cell.

In case the cells have to be connected in parallel, all polar bridges 4 coordinated to the positive electrode plates of the individual cells and aligned one behind the other are threaded through by one clamping screw 7, which by means of one cone 22 each at its both ends clamps the cells together. To secure an integral electrical connection between the polar bridges 4, rings of electrically conductive material are set into the annular spaces formed by the recesses 23 facing each other of two adjacent cells, the one of which is marked by an arrow $x$ in FIG. 10. The recesses 23 result from each polar bridge being shorter than the thickness of one cell. The connection between the polar bridges 3 of the individual cells which are coordinated to the negative electrode plates is effected in the same way as the one between the polar bridges 4.

Instead of inserting rings into the annular spaces the same result could be obtained by setting a cone 22 into each half of every hollow twin cone 20.

In the first embodiment of the storage battery the polar bridges are provided with axial bores which are lined with insulating bodies, which latter are threaded by clamping screws. Thereby the possibility results to arrange the cells connected in series or in parallel by means of disks glided over the clamping screws between the individual cells.

It has been found that particularly for six or more cells containing storage batteries the length of such storage batteries is undesirably extended, due to the disks which are arranged between the individual cells, so that in motor vehicles, for example, where space conditions in the motor room are usually rather restricted the positioning of the storage batteries meets with difficulties.

The object of the second embodiment is to avoid said disadvantage in providing a storage battery characterized by an extremely compact assembly of the individual cells. This design enables not only an extremely compact assembly but also any desired assembly of the individual cells in respect to connection technique.

It is obvious, without further, that cells showing the same design and the same shape may be arranged side by side, in consecutive order or one upon the other, using the described or adequately modified connecting elements (clamping screws, connecting bows, etc.), whereby connecting in series, in parallel or in groups is possible.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim:

1. A storage battery comprising at least two cells, each cell comprising a pair of elongated annular electrically conductive elements extending between opposite sides of the cell, and at least two plates of opposite polarity, the plates of one polarity being connected to one of said annular elements and the plates of the opposite polarity being connected to the other annular element; and a pair of rods, one rod passing through one annular element of each cell and the other rod passing through the other annular element of each cell for securing said cells to each other.

2. A storage battery according to claim 1 further comprising insulating means in said annular elements to electrically insulate said annular elements from said rod means.

3. A storage battery comprising at least two cells, each cell comprising at least one elongated annular electrically conductive element extending between opposite sides of the cell and an adjustable overpressure valve to permit compensation for pressure differences between the interior and the exterior of the cell and comprising a resilient member having an elongated slit therein and a non-resilient member adjacent said resilient member and having an elongated hole therein adjacent said slit, one of said members being rotatably adjustable whereby the amount of gas which is permitted to pass through said overpressure valve can be controlled; and rod means passing through said annular elements of each of said cells for securing said cells to each other.

4. A storage battery according to claim 3 wherein said resilient and nonresilient members are circular discs, said overpressure valve further comprising a ring member for releasably securing said discs in a predetermined relative position.

5. A storage battery comprising at least two cells, each cell comprising at least one elongated annular electrically conductive element extending between opposite sides of the cell, and rod means passing through the annular elements of each of said cells for securing said cells to each other, each of said annular elements having a narrow cross-section intermediate the ends thereof and extending with progressively increasing cross-section towards the opposite ends thereof, each said cell comprising longitudinal side walls, electrically insulating centering flanges at opposite ends of each annular element located flush with said walls and providing a seal between said walls and said annular elements, and an electrically conductive annular cone member positioned about said rod means in the annular electrically conductive element of the cells at the opposite ends of said rod means for centrally locating said rod means in the annular elements of each cell through which said rod means passes.

6. A storage battery according to claim 5 wherein the length of each annular element is shorter than the distance between the exterior surfaces of the opposite side walls of the cell whereby recesses are provided at the opposite ends of said annular element, electrically conductive rings being located in said recesses whereby electrical contact is made between the rings of adjacent cells secured together by said rod means.

7. A storage battery according to claim 5 wherein said cells are connected in parallel, said rod means comprising a plurality of rods, each rod extending between a pair of adjacent cells, an annular cone member being positioned in the annular element of each cell.

* * * * *